(12) United States Patent
Demeuse

(10) Patent No.: US 6,232,402 B1
(45) Date of Patent: May 15, 2001

(54) FILMS BASED ON THREE COMPONENT POLYOLEFIN BLEND

(76) Inventor: Mark Thomas Demeuse, 111 Cardinal Cir., Hockessin, DE (US) 19707

( * ) Notice: Subject to any disclaimer, the term of this patent is extended or adjusted under 35 U.S.C. 154(b) by 0 days.

(21) Appl. No.: 09/427,765

(22) Filed: Oct. 28, 1999

(51) Int. Cl.[7] .............................. C08F 8/00; C08L 23/00; C08L 23/04

(52) U.S. Cl. ............................................ 525/191; 525/240

(58) Field of Search ...................................... 525/191, 240

(56) References Cited

U.S. PATENT DOCUMENTS

| | | | |
|---|---|---|---|
| 4,354,004 | * 10/1982 | Hughes et al. | 525/240 |
| 5,358,792 | * 10/1994 | Mehta et al. | 428/516 |

* cited by examiner

*Primary Examiner*—Nathan M. Nutter
(74) *Attorney, Agent, or Firm*—Caesar, Rivise, Bernstein, Cohen & Pokotilow, Ltd.

(57) ABSTRACT

Polyolefin films having high oxygen transmission values are composed of blends of 75 to 92% isotactic polypropylene, 5 to 15% by weight low density polyethylene and 3 to 10% by weight of an olefin heteropolymer containing propylene and at least one other olefin 2 to 4 carbon atoms having a melting point less than that of polypropylene and a density ofr at least about 0.95 g/cc.

13 Claims, No Drawings

FILMS BASED ON THREE COMPONENT POLYOLEFIN BLEND

This invention relates to polyolefin films having certain unique properties. Specifically, it relates to clear polyolefin films based on polyethylene and polypropylene that exhibit an increased oxygen transmission property as compared to conventional polypropylene films known to the art.

BACKGROUND INFORMATION

It is known that, for many applications, particularly packaging applications, polypropylene is less than totally satisfactory due to a relatively high permeability to oxygen. Typically, a 0.7 mil (70 gauge) biaxially oriented film of polypropylene exhibits an oxygen transmission rate (OTR) of about 125 cc/100 sq. in./day/atmosphere. Such an OTR is too great for such applications as packaging of potato chips, most chocolate candy, processed meats and cheese and other packaging applications where an excess of oxygen can lead to premature spoilage of the packaged product.

A great amount of effort has been expended in recent years to decrease the oxygen transmission characteristics of polypropylene. The best results to date have been obtained by metallization of the films.

There are, however, some applications in which a greater and controllable oxygen transmission rate is desired. This is particularly the case when fresh fruits, vegetables and flowers are to be packaged as these products continue to respire after they are packaged. Absence or insufficient levels of oxygen, which occurs as the oxygen initially present in the package is consumed, leads to premature senescence and spoilage of the products. At the same time, respiration leads to a build-up of moisture in the package, which can also lead to spoilage of the product if the moisture cannot escape from the package. It is thus desirable to provide polypropylene packaging wherein the oxygen content can be replenished as necessary and from which the moisture can escape.

Conventional polypropylene films of a thickness required for most applications, whether monolayer or composite, have oxygen and moisture vapor permeability values that are not sufficient to allow the optimum oxygen and moisture levels to be maintained in a sealed package containing products of the type mentioned.

It is known to prepare microporous films based on an opaque polymer mixture comprised of about 45% to 55% homopolypropylene and 55% to 45% of a copolymer of propylene and ethylene containing about 2% to 5% ethylene by weight, which films have greater oxygen permeability than films made of plain polypropylene. This polymer mixture is blended into a mixture comprised of about 40 to 60% of the polymer mixture and 60 to 40% of certain inorganic filler materials and is subjected to biaxial orientation. Anderson, U.S. Pat. No. 4,842,875, teaches the use of such films in the preparation of controlled atmosphere containers for use with fresh vegetables, fruits and flowers.

Microporous films known to the art as described above function reasonably well for preparing films having increased and, to a degree, controllable oxygen and moisture vapor permeability. However, the voiding pigments employed in the prior art are of a particle size large enough and are employed in concentrations great enough to result in formation of voids of such a size that the resultant films are almost totally opaque.

It is also known to prepare polyolefin films of high oxygen transmission rate for some applications by laminating a polyethylene film of about one mil thickness to a polypropylene film of about 0.4 to 0.5 mil thickness. The polypropylene film acts as a stiffener to give the polyethylene sufficient stiffness that it can be used as a produce wrapper. The polyethylene, which has an inherently high OTR, then acts as a high OTR sealant layer.

In work leading to this invention, it has been found that, by blending low density polyethylene and polypropylene within specific blending ratios, a film can be prepared that has a sufficiently high oxygen transmission rate (OTR) that it can be used for packaging fresh fruits, flowers and vegetables that require a continuous replenishment of the oxygen supply in the closed package. Films having the desired properties can be prepared from blends consisting essentially of about 61 to 85% by weight of isotactic polypropylene and 39 to 15% by weight of low density polyethylene. Such films also exhibit a sufficiently great stiffness to permit their use in this application.

Films prepared with the blends just described, when cast and drawn to a typical packaging film thickness, i.e. 0.7 to 0.8 mil (70 to 80 gauge), exhibit several properties that make them desirable for the packaging of fresh produce items. They are of a stiffness required of packaging materials generally, i.e. a tensile modulus sufficient to allow the films to be handled in conventional film conversion equipment. In addition, such films exhibit an OTR greater than 200 cc/100 sq. in./day/atmosphere; a level at which the packaged product can continue to respire for a reasonable time after it has been harvested, thus assuring a reasonable shelf life for the product.

While films prepared with polypropylene and low density polyethylene in the ratios expressed in the previous paragraph exhibit the OTR and stiffness required for the contemplated application, they are not so clear and haze-free as is desired for prepackaging of produce for the retail market. For this application, a clear film is required in order to display the product most attractively to the shopper in, e.g. a supermarket display or the like. A clear film, for the purposes of this invention, is defined as one having a haze value less than about 4% as determined by the Gardner Haze Meter.

Based on the above, it can be said that, in general, a film product for use in packaging of fresh fruits, vegetables and flowers for the retail market must have sufficient stiffness to allow it to be handled on conventional film conversion equipment, sufficient OTR to allow the contents to continue respiring for a reasonable time after they are packaged and be sufficiently haze-free to be attractively displayed to a purchaser in the marketplace.

It is the object of the invention to provide polyolefin films based on polypropylene and low density polyethylene that have the properties required to be useful in modified atmosphere packaging applications for packaging fresh vegetables, fruits and flowers.

BRIEF DESCRIPTION OF THE INVENTION

In accordance with this invention, there are provided films having the desired higher oxygen transmission rate (OTR) required for the packaging of fresh produce items, said films being prepared with blends of polypropylene and low density polyethylene, which films also contain an olefin heteropolymer of at least two α-monoolefins.

Specifically, the invention is a biaxially oriented film comprised of a polyolefin mixture consisting essentially of
  a) about 75 to 92% by weight of isotactic polypropylene;
  b) about 5 to 15% by weight of low density polyethylene having a density less than about 0.935; and c) about 3 to 10% by weight of an olefin heteropolymer containing propylene and at least one other α-olefin of 2 to 4 carbon atoms, said heteropolymer having a melting point less than that of polypropylene and a density no greater than about 0.95 g/cc.

Films prepared with polymer compositions within the specified limits are found to have properties that meet specifications for commercial use in the packaging of fresh fruits, vegetables and flowers. Specifically, these films exhibit an OTR of at least 200 cc/100 sq.in./day/atmosphere, a modulus of at least about 195,000 psi, preferably at least 200,000 psi and a haze value no greater than about 4%.

DETAILED DESCRIPTION OF THE INVENTION

In the following discussion, gas permeability properties of the films of the invention will be discussed in terms of their OTR. Carbon dioxide transmission rate is also an important parameter of these films affecting their utility as packaging materials for fresh produce items since carbon dioxide is also generated as the product continues to respire. Carbon dioxide transmission rates can be estimated using the generally accepted factor of a weight ratio of carbon dioxide to oxygen transmitted per unit of time of about 4 to 1.

The term "α-monoolefin", as used herein, refers to a linear hydrocarbon having one carbon-carbon double bond, which double bond is located at the end of the linear chain. The term is intended to include any such monomer having 6 carbon atoms or less, including ethylene and propylene.

When used in this disclosure, the term "low density polyethylene" is intended to indicate a polyethylene species having a density less than about 0.935 gm/cc and preferably between about 0.915 gm/cc and 0.935 gm/cc. By contrast, high density polyethylene, widely used in the film art for preparing polyethylene film, has a density on the order of 0.95–0.97 gm/cc.

Low density polyethylenes are known, commercially available materials. Typical of commercially known low density polyethylenes are Chevron 1017 (Chevron Chemicals, Houston, Tex.), Exxon Exact 3132 (Exxon Chemicals, Houston, Tex.), and Petrothene NA321 (Quantum Chemical, Chicago, Ill.), These polymers can be ethylene homopolymers or they can be copolymers of ethylene with a linear α-monoolefin having 4 to 8 carbon atoms in which the ethylene predominates. Such copolymers are also referred to in the art as low density polyethylenes.

The term "heteropolymer" is intended to mean an olefin polymer containing propylene and at least one other α-monoolefin. The materials found useful in the practice of this invention have melting points lower than that of polypropylene and a density no greater than about 0.95 gm/cc and preferably between 0.91 and 0.95 g/cc.

Typical of such heteropolymers are ethylene-propylene copolymers having about 4.5 to 6% by weight of ethylene, butene-propylene copolymers containing about 5 to 34% by weight of butene-1 and ethylene-propylene-butene-1 terpolymers. Such heteropolymers as those described are well known in the polyolefin art and are widely used as heat seal layers on commercial polypropylene composite films. In those applications, the heteropolymers comprise very thin layers on the surface of a relatively thick polypropylene core. Exemplary commercially available heteropolymers that can be employed in the practice of the invention include Fina 8573, Fina Z9470 (Fina Chemical Co. Houston Tex.) and Sumitomo SP88E5 (Sumitomo Chemical Company, Tokyo, Japan).

As pointed out above, while low density polyethylene alone blended with polypropylene produces an oriented film having the useful oxygen and moisture vapor transmission required for the application contemplated, the films are not as clear and haze-free as some users prefer. To meet this demand for a lower haze product, the film-forming blend also includes, as a third component, the above described olefin heteropolymer containing propylene and at least one other α-monoolefin of two or more carbon atoms. The presence of this heteropolymer dramatically reduces the haze level of the product when it is drawn to produce an oriented film.

Any isotactic polypropylene can be employed in the manufacture of films according to the invention. However, it is preferred to use one of the newer, high modulus species of polypropylene. References to high modulus polypropylene are intended to mean a polypropylene or a polypropylene composition, a film of which has a modulus greater than that of a conventional propylene homopolymer film of the same thickness drawn to the same draw ratio using the same drawing technique, i.e. bubble or tenter. For example, the modulus of a 70 gauge (0.7 mil thickness) film of conventional polypropylene, drawn 7× by 7× on simultaneous draw equipment is on the order of 400,000 psi. The modulus of a high modulus polypropylene of the same thickness, similarly drawn, is at least about 450,000 psi.

Suitable and preferred polypropylenes, which exhibit the required high modulus characteristics for use in the blends, include the newly developed high crystallinity polypropylene. This material, available under several trade names, is defined as having an isotactic index of at least 93%, and preferably at least about 95%, i.e., the polymer contains no more than about 7%, and preferably no more than about 2 to 5% xylene soluble materials. Typical high crystallinity polypropylene is further characterized by higher stiffness, greater surface hardness, lower heat deflection at high temperatures, lower heat shrinkage and better creep properties than conventional isotactic polypropylenes, which have isotactic index generally less than 93%. Typical high crystallinity polypropylenes that can be employed include ACCPRO 9117, ACCPRO 9119 and ACCPRO 9218 (all available from Amoco Polymers, Alpharetta, Ga.), and also Chisso HF 5010 and Chisso XF 2805 (Chisso Chemical Co. Ltd., Tokyo, Japan and Aristech FF035C (Aristech Chemical Co. Pittsburgh, Pa.).

Another polypropylene composition having the high modulus required for use in the blends employed in this invention can be prepared by blending conventional commercial isotactic polypropylene prepared via Ziegler-Natta catalysis with a polypropylene prepared by use of a metallocene catalyst. Such blends and films prepared therewith are described in copending and commonly assigned U.S. patent application Ser. No. 09/055,389, filed Apr. 6, 1998. In the referenced application, it is shown that very significant increases in tensile modulus are realized when these polymer types are blended. Such modulus improvements are realized with blends containing 10 to 90% of the Ziegler-Natta polymer.

Another species of high modulus polypropylene that can be employed in the films of the invention is nucleated polypropylene. These are conventional polypropylenes that have been nucleated to increase their crystallinity level and which exhibit higher modulus as a result. An example of a nucleated polypropylene is Aristech FF035C (Aristech Chemical Co., Pittsburgh, Pa.).

Film forming and drawing to effect biaxial orientation can be carried out by conventional techniques, i.e. the well known tubular (bubble) process or the equally well known tenter process can be employed. When the films are prepared by the tubular process, the draw is effected simultaneously and uniformly in the machine and cross directions to about 3× to 7× and preferably about 5× to 7×. Using the tenter process, drawing is carried out sequentially to about 3× to 7× in the machine direction and to about 7× to 11× in the cross direction.

Films according to the invention that exhibit the high OTR and MVTR characteristic can be either monolayer or composite films wherein the polypropylene/low density polyethylene/heteropolymer blend is a core layer having a functional skin layer on either or both of its surfaces. Skin layers must have OTR and MVTR greater than that of the blended core. In either the monolayer or composite embodiment, the films are generally of a thickness from about 0.5 to 1.0 mil and preferably from about 0.5 to 0.8 mil.

Functional layers that can be employed as the skin layer include such layers as, e.g., a heat seal layer. Such a layer will be of a material of lower melting point than the core so that when heat is applied to effect the seal, the orientation of the core layer will not be disturbed. A commonly used heat seal layer is a terpolymer of propylene, ethylene and butene-1. In general, any of the heteropolymers that are useable in the core layer can be used as sealant layers. Other polymers that can be employed as a heat seal layer include polyvinyl and polyvinylidene chloride.

Another commonly used functional layer is a slip layer to facilitate handling of the film during later converting operations. Such a layer is comprised of a polymer containing a slip agent such as a high molecular weight fatty acid amide. A functional layer may also contain an antiblock additive to facilitate unwinding of the film after it has been wound at the terminus of the film manufacturing process.

To improve processability, from about 0.1 to 1% by weight, and preferably about 0.2 to 0.5% by weight, of an organic or inorganic antiblocking agent can be added to the top layer or layers. Suitable antiblocking agents are, e.g., incompatible organic polymers such as polyamides, polyesters, polycarbonates and the like or inorganic substances such as silicon dioxide and silicates. These materials are generally placed in the skin layer or layers of the film.

Typical slip agents are fatty acids or fatty acid amides. They can generally be classified as either as primary amides, secondary amides or secondary bis-amides. Examples of primary amides include stearamide, oleamide and erucamide. Exemplary secondary amides that can be used include oleyl palmitamide and stearyl erucamide. Secondary bis-amides are ethylene bis-stearamide and ethylene bis-oleamide. The amides are usually used at concentration levels of 0.3% by weight or less. They may be contained in either the skin layer or the core layer.

The films according to the invention, in either the monolayer or the composite embodiment can also be provided with a cold seal coating. Such a coating is typically a rubber adhesive applied to the polymer surface.

The film surfaces can also be treated with an oxidative medium to create polar sites on the surfaces thereof and thus make the surfaces printable. A preferred oxidative medium is corona discharge. Another preferred oxidative technique is flame treatment. Another, but less preferred technique is the use of an oxidizing acid. One skilled in the film art can readily determine the best treatment technique to use and the degree of oxidative treatment required for a particular application.

PREPARING POLYOLEFIN BLENDS FOR FILMING

In the examples that follow, pellets of the desired polypropylene, low density polyethylene and heteropolymer were dry mixed in the desired ratios and melt blended in a Leistritz twin screw extruder (American Leistritz Extruder Corporation, Somerville, N.J.). Strands of the blended polymer mass were extruded into a water bath at room temperature to quench the molten polymer and the quenched strands were chopped into pellets.

EXAMPLE 1

A series of polymer blends containing isotactic polypropylene, low density polyethylene and an olefin heteropolymer were prepared as indicated above. The polypropylene employed was Aristech FF035C, the low density polyethylene was Chevron 1017 LDPE, (density 0.917 gm/cc) and the heteropolymer was Fina 8573, (Fina Chemical Co. Houston Tex.) a copolymer of ethylene and propylene containing 4.5% ethylene. This copolymer has a melting point of about 134° C. and a melt flow rate of 6.8 g/10 minutes and a density of about 0.895.

Films were extruded through a single layer casting die onto a casting roll maintained at between about 75 and 80° C. at a casting speed of about 3.1 feet per minute.

All of the cast films were drawn 6× by 6× on a T. M. Long Stretcher (T. M. Long Corporation, Somerville, N.J.) at a temperature of 150° C. after a 25 second preheat. These films were found to have the desired high OTR and modulus. Relevant test data along with controls containing none of the heteropolymer are presented in Table 1.

TABLE 1

| Spec # | % PP | % LDPE | % HET | GAUGE | MODULUS | % HAZE | OTR |
|---|---|---|---|---|---|---|---|
| C-1 | 75 | 25 | 0 | 75 | 257,079 | 10.6 | 263.4 |
| C-2 | 90 | 10 | 0 | 68 | 351,733 | 50 | 204.1 |
| I-1 | 80 | 15 | 5 | 69 | 343,989 | 3.6 | 222.0 |
| I-2 | 92 | 5 | 3 | 70 | 380,281 | 1.4 | 206.0 |
| I-3 | 75 | 15 | 10 | 71 | 280.921 | 2.5 | 275.4 |
| C-3 | 70 | 20 | 10 | 68 | 190,249 | 7.2 | 235.1 |
| C-4 | 95 | 3 | 2 | 70 | 435,837 | 1.3 | 180.7 |
| C-5 | 100 | 0 | 0 | 71 | 481,400 | 0.59 | 132.0 |

The data in Table 1 illustrate the invention very well. Specimens C-1, C-2, C-3 and C-4 are control examples. C-1 and C-2 show the effect of having low density polyethylene present without but no heteropolymer, i.e. haze levels are unacceptably high, even though modulus and OTR are good. C-3 demonstrates the effect of having insufficient polypropylene and a concomitant high level of low density polyethylene, i.e. modulus is low and haze is excessive. C-4 demonstrates the effect of having an excessive amount of polypropylene, i.e. the OTR is below the desired level. Specimens I-1, I-3 and I-3, which are illustrative of the invention, all have modulus, haze and OTR within the desired ranges.

EXAMPLE 2

Additional specimens were prepared as in Example 1 except that Exxon Exact 3132 (density 0.922 gm/cc) was employed as the LDPE. Films were cast and drawn substantially as in Example 1. All of the cast films were drawn 6× by 6× on a T. M. Long Stretcher (T. M. Long Corporation, Somerville, N.J.) at a temperature of 150° C. after a 25 second preheat. Relevant test data are recorded in Table 2.

TABLE 2

| Spec # | % PP | % LDPE | % HET | GAUGE | MODULUS | % HAZE | OTR |
|---|---|---|---|---|---|---|---|
| C-6 | 75 | 25 | 0 | 58 | 221,896 | 10.6 | 298.9 |
| I-4 | 75 | 15 | 10 | 69 | 208,546 | 3.6 | 285.6 |
| I-6 | 80 | 15 | 5 | 71 | 225,678 | 3.4 | 26 |

Here again, it is readily seen that an excess of the low density polyethylene content results in the haze becoming too great for use in films intended for use in the contemplated application.

EXAMPLE 3

The procedures substantially according to the previous examples were repeated using a film-forming composition consisting of Accpro 9117 high crystalline polypropylene (Amoco Polymers, Alpharetta, Ga.), Chevron 1017 low density polyethylene and Fina Z9470 heteropolymer (Fina Chemical Co., Houston Tex.). Melting point of the Fina Z9470 is 129° C. and the MFR is 5 g/10 minutes. Relevant data for these films are recorded in Table 3.

TABLE 3

| SPEC. # | % PP | % LDPE | % HET | GAUGE | OTR | % HAZE | MODULUS |
|---|---|---|---|---|---|---|---|
| C-6 | 75 | 25 | 0 | 73 | 270.2 | 9.8 | 255,463 |
| C-7 | 90 | 10 | 0 | 66 | 206.03 | 4.8 | 346,728 |
| I-6 | 80 | 15 | 5 | 68 | 225.3 | 3.4 | 325,326 |
| I-7 | 92 | 5 | 3 | 73 | 202.3 | 1.2 | 393632 |
| I-8 | 75 | 15 | 10 | 67 | 268.4 | 2.7 | 268,322 |

This example clearly demonstrates the criticality of the presence of the olefin heteropolymer. Even though the content of the two ingredients employed in Specimens C-5 and C-6 is within the specified limits, the haze values of the specimens is greater than the allowable upper limit specified.

The data clearly show that films of increased OTR and satisfactory modulus are prepared when the polyolefin blends employed in the invention are within the concentration limits specified herein.

What is claimed is:

1. A biaxially oriented film comprised of a polyolefin mixture consisting essentially of
    a) about 75 to 92% by weight of isotactic polypropylene,
    b) about 5 to 15% by weight of low density polyethylene having a density no greater than about 0.935 g/cc and
    c) about 3 to 10% by weight of an olefin heteropolymer containing propylene and at least one other 2 to 4 carbon α-olefin, said heteropolymer having a melting point less than that of polypropylene and a density no greater than about 0.95 g/cc.

2. A film according to claim 1 wherein the polypropylene is a high crystalline polymer having an isotactic index of at least about 93%.

3. A film according to claim 3 wherein the low density polyethylene has a density between about 0.915 and 0.935 g/cc.

4. A biaxially oriented film comprised of a polyolefin mixture consisting essentially of
    a) about 75 to 92% by weight of isotactic polypropylene,
    b) about 5 to 15% by weight of low density polyethylene having a density no greater than about 0.935 g/cc and
    c) about 3 to 10% by weight of an olefin heteropolymer containing propylene and at least one other α-olefin of 2 to 4 carbon atoms, said heteropolymer having a melting point less than that of polypropylene and a density no greater than about 0.95 g/cc, said film having an oxygen transmission rate of at least 200 cc/100 sq. In./day/atmosphere, a modulus of at least about 195,000 psi and a haze value no greater than about 4%.

5. A film according to claim 4 which is a composite film having a functional layer applied to one or both of its surfaces.

6. A film according to claim 4 wherein the polypropylene is a high crystalline polymer having an isotactic index of at least about 93%.

7. A film according to claim 6 which is a composite film having a functional layer applied to one or both of its surfaces.

8. A film according to claim 7 wherein the low density polyethylene has a density between about 0.915 and 0.935 g/cc.

9. A film according to claim 4 wherein the modulus is at least 200,000 psi.

10. A film according to claim 9 which is a composite film having a functional layer applied to one or both of its surfaces.

11. A film according to claim 9 wherein the polypropylene is a high crystalline polymer having an isotactic index of at least about 93%.

12. A film according to claim 11 which is a composite film having a functional layer applied to one or both of its surfaces.

13. A film according to claim 12 wherein the low density polyethylene has a density between about 0.915 and 0.935 g/cc.

* * * * *

UNITED STATES PATENT AND TRADEMARK OFFICE
CERTIFICATE OF CORRECTION

PATENT NO.     : 6,232,402 B1
DATED          : May 15, 2001
INVENTOR(S)    : DeMeuse It is certified that error appears in the above-identified patent and that said Letters Patent is hereby corrected as shown below:

<u>Column 8,</u>
Line 6, should read
-- 3. A film according to claim 1 wherein the low density polyethylene has a density between about 0.915 and 0.935 g/cc. --

Signed and Sealed this

Twenty-third Day of July, 2002

*Attest:*

*Attesting Officer*

JAMES E. ROGAN
*Director of the United States Patent and Trademark Office*